United States Patent
Gruetzmacher et al.

(10) Patent No.: US 8,810,090 B2
(45) Date of Patent: Aug. 19, 2014

(54) FREQUENCY CONVERTER ASSEMBLY HAVING CONVERTER HOUSING ATTACHED THROUGH INTERMEDIATE COMPONENT TO MOTOR HOUSING

(75) Inventors: Thomas Gruetzmacher, Remscheid (DE); Steffen Penzek, Bergkamen (DE); Daniel Haase, Arnsberg (DE); Thomas Peters, Sundern (DE); Herwig Rilling, Kamen (DE)

(73) Assignee: Kostal Industrie Elektrik GmbH, Luedenscheid (DE)

( * ) Notice: Subject to any disclaimer, the term of this patent is extended or adjusted under 35 U.S.C. 154(b) by 350 days.

(21) Appl. No.: 13/282,003

(22) Filed: Oct. 26, 2011

(65) Prior Publication Data

US 2012/0126645 A1    May 24, 2012

(30) Foreign Application Priority Data

Nov. 22, 2010 (DE) .......................... 10 2010 051 891

(51) Int. Cl.
*H02K 5/22* (2006.01)
*H02K 11/04* (2006.01)

(52) U.S. Cl.
USPC .......................................... 310/71; 310/68 R

(58) Field of Classification Search
CPC ...................................................... H02K 5/225
USPC .......................................... 310/71, 68 R, 67 R
IPC ............................................... H02K 5/22,11/04
See application file for complete search history.

(56) References Cited

U.S. PATENT DOCUMENTS

| 4,451,750 | A  | * | 5/1984 | Heuer et al. ..................... 310/71 |
| 4,963,778 | A  |   | 10/1990 | Jensen et al. |
| 6,229,232 | B1 | * | 5/2001 | Roth-Stielow et al. ......... 310/52 |
| 2005/0167183 | A1 | * | 8/2005 | Tominaga et al. ............. 180/444 |
| 2010/0127602 | A1 | * | 5/2010 | Rueggen et al. ............ 310/68 D |

FOREIGN PATENT DOCUMENTS

| DE | 3642724 A1 | 6/1988 |
| DE | 10109797 A1 | 9/2002 |
| DE | 102006016271 A1 | 10/2006 |
| DE | 202007016431 U1 | 2/2008 |
| DE | 102008058511 A1 | 5/2010 |
| EP | 1059723 A1 | 12/2000 |

* cited by examiner

*Primary Examiner* — Michael Andrews
(74) *Attorney, Agent, or Firm* — Brooks Kushman P.C.

(57) ABSTRACT

A frequency converter assembly includes a frequency converter, a motor, and an intermediate component. The frequency converter includes a converter housing with an opening. The motor includes a motor having a motor housing with a terminal block. The intermediate component is attached to the motor housing around the terminal block and is attached to the converter housing such that the intermediate component is between the housings with the terminal block being accessible through the opening of the converter housing.

4 Claims, 3 Drawing Sheets

FREQUENCY CONVERTER ASSEMBLY HAVING CONVERTER HOUSING ATTACHED THROUGH INTERMEDIATE COMPONENT TO MOTOR HOUSING

REFERENCE TO RELATED APPLICATIONS

This application claims foreign priority benefits under 35 U.S.C. §119(a)-(d) to DE 10 2010 051 891.3, filed Nov. 22, 2010; the disclosure of which is hereby incorporated by reference in its entirety.

TECHNICAL FIELD

The present invention relates to a frequency converter for controlling an electric motor in which the converter includes a housing for installation on the housing of the motor and includes an intermediate component that replaces a terminal box and is located between the housings.

BACKGROUND

Frequency converters are used as static frequency converters for operating electric motors including synchronous and asynchronous machines. The connection of a frequency converter and a motor to form a combined structural unit has advantages with respect to interfering electromagnetic disturbances compared to deployment of the converter in a separate switching cabinet away from the motor.

DE 36 42 724 A1 (corresponds to U.S. Pat. No. 4,963,778) describes a frequency converter for controlling a motor. The converter is arranged in a converter housing that is designated as a terminal box. A power supply-side connection line of the converter, in the form of an attached cable, leads out from the converter housing. An adapter is on the converter housing. The adapter has plug pins for connecting the output side of the converter to contacts of the motor. Installing the converter housing on the motor housing causes of the plug pins to make contact with corresponding sockets on the motor side which are electrically connected with the motor windings.

EP 0 958 646 B1 (corresponds to U.S. Pat. No. 6,229,232) describes a frequency converter for controlling a motor. The converter includes a housing for installation on the housing of the motor and an intermediate component in place of a terminal box. The intermediate box is located between the housings. The intermediate component forms the lower part of the converter housing. The electronics of the converter are contained in the upper part of the converter housing. The electrical connection of the electronics of the converter within the intermediate component is accomplished through plug-and-socket connectors.

The above-noted designs are advantageous for electric motors in the lower to middle power classifications configured to match frequency converters for this purpose. However, other designs are desired for frequency converters for higher powered electric motors as the plug-and-socket connectors are not suitable contact means for the typically encountered current levels.

SUMMARY

An object of the present invention is a frequency converter for controlling an electric motor in which the frequency converter is capable of handling relatively high currents without relinquishing flexibility and ease of assembly.

In carrying out one or more of the above object and other objects, the present invention provides a frequency converter assembly having a frequency converter, a motor, and an intermediate component. The frequency converter has a converter housing with an opening. The motor has a motor housing with a terminal block. The intermediate component is attached to the motor housing around the terminal block and is attached to the converter housing such that the intermediate component is between the housings with the terminal block being accessible through the opening of the converter housing.

A frequency converter assembly in accordance with embodiments of the present invention includes a frequency converter, an electric motor, and an intermediate component. The frequency converter is for controlling the motor. The frequency converter includes a converter housing. The converter housing includes a lower housing part and a housing cover. The lower converter housing part contains a printed circuit board having the control and power electronic components of the frequency converter. The motor includes a motor housing and a terminal block. The terminal block of the motor is part of the motor housing. The intermediate component performs the function of a terminal box and thereby replaces the terminal box. The intermediate component includes retaining elements. The retaining elements of the intermediate component are configured to be used to mechanically fasten the lower converter housing part to the intermediate component. The lower converter housing part includes an opening on its underside. The terminal block of the motor is accessible through the opening on the underside of the lower converter housing part. The terminal block of the motor is accessible through the opening in order to enable electrical connector lines to be fastened to and/or released from the terminal block after the lower converter housing part is fastened onto the intermediate component and before the housing cover is placed onto the lower converter housing part.

A relatively high current carrying ability may be achieved for the electrical connections by the use of screw or spring terminals instead of plug contacts for connecting the motor connector lines (e.g., the motor windings) to the input lines from the printed circuit board of the frequency converter. As such, the frequency converter is suited for use with electric motors having higher power classifications.

In an embodiment, the intermediate component is screwed directly onto a fitting of the motor housing.

In an embodiment, the lower converter housing part is composed of a material having a high thermal conductivity such as aluminum and/or the lower converter housing part includes cooling fins on its lower external wall so that the heat losses arising primarily in the power components of the frequency converter can be removed effectively.

The above features, and other features and advantages of the present invention are readily apparent from the following detailed description thereof when taken in connection with the accompanying drawings.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
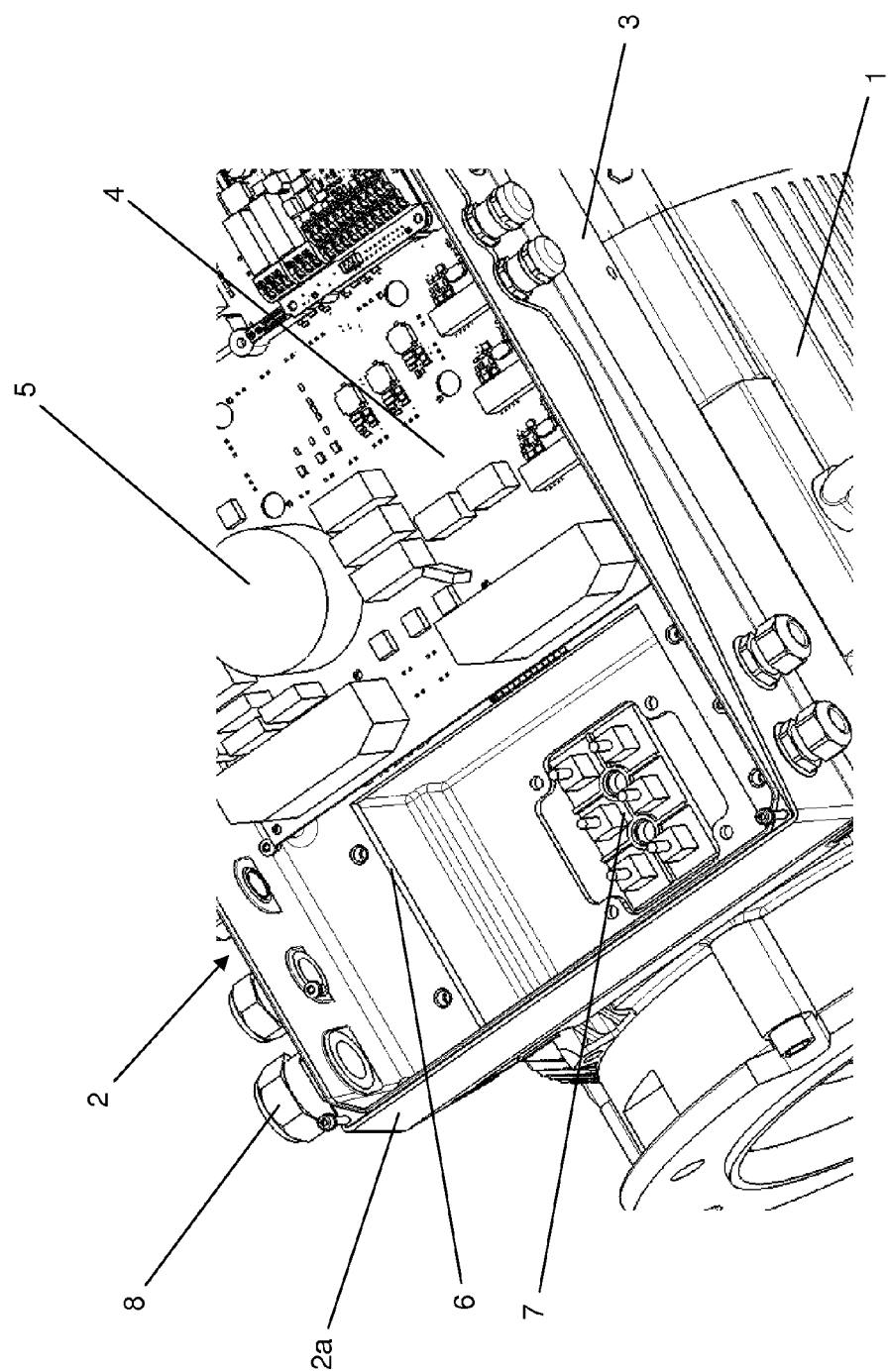
FIG. 1 illustrates a frequency converter assembly having a frequency converter, an electric motor, and an intermediate component in accordance with an embodiment of the present invention in which the frequency converter is installed via the intermediate component onto the motor.
Figure 2:
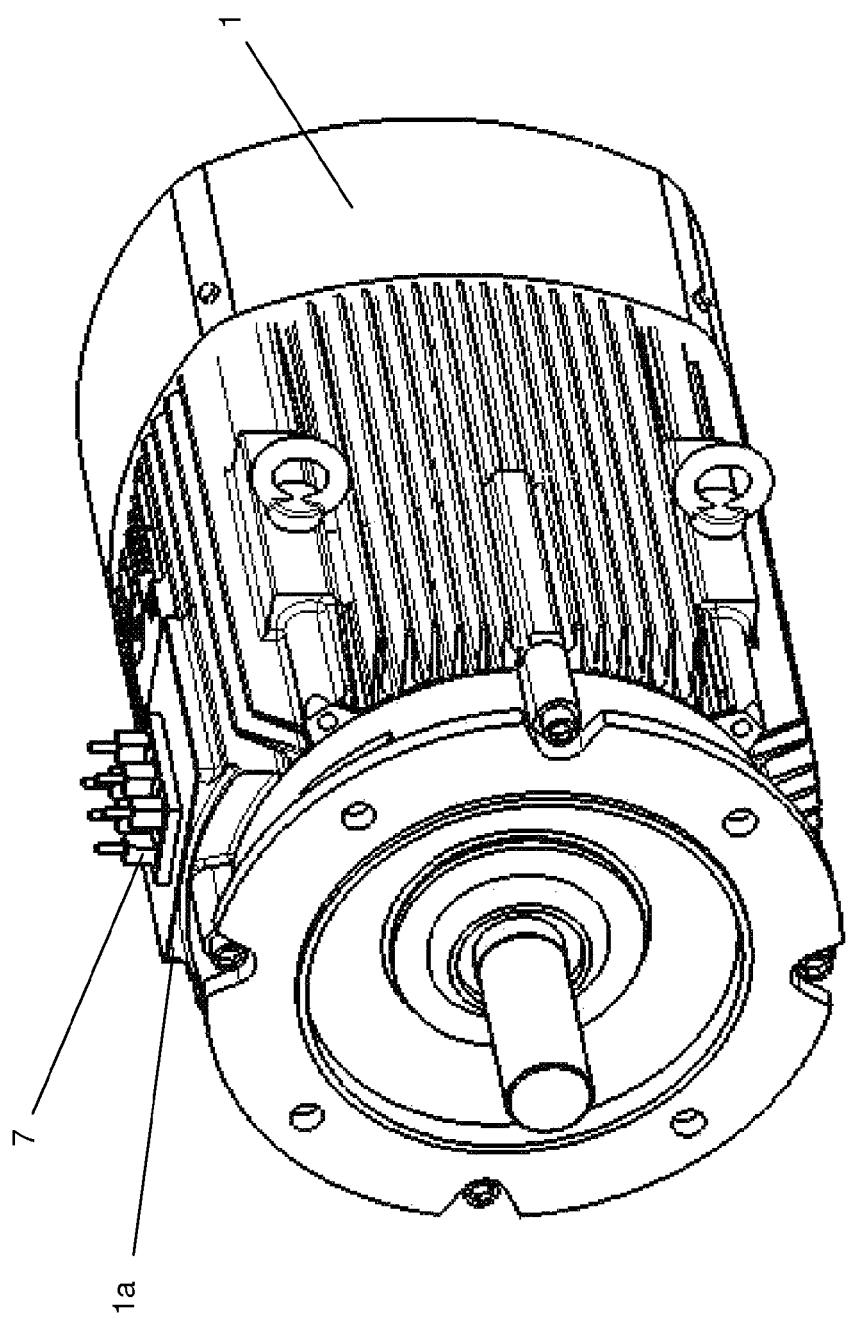
FIG. 2 illustrates the motor of the frequency converter assembly shown in FIG. 1.
Figure 3:
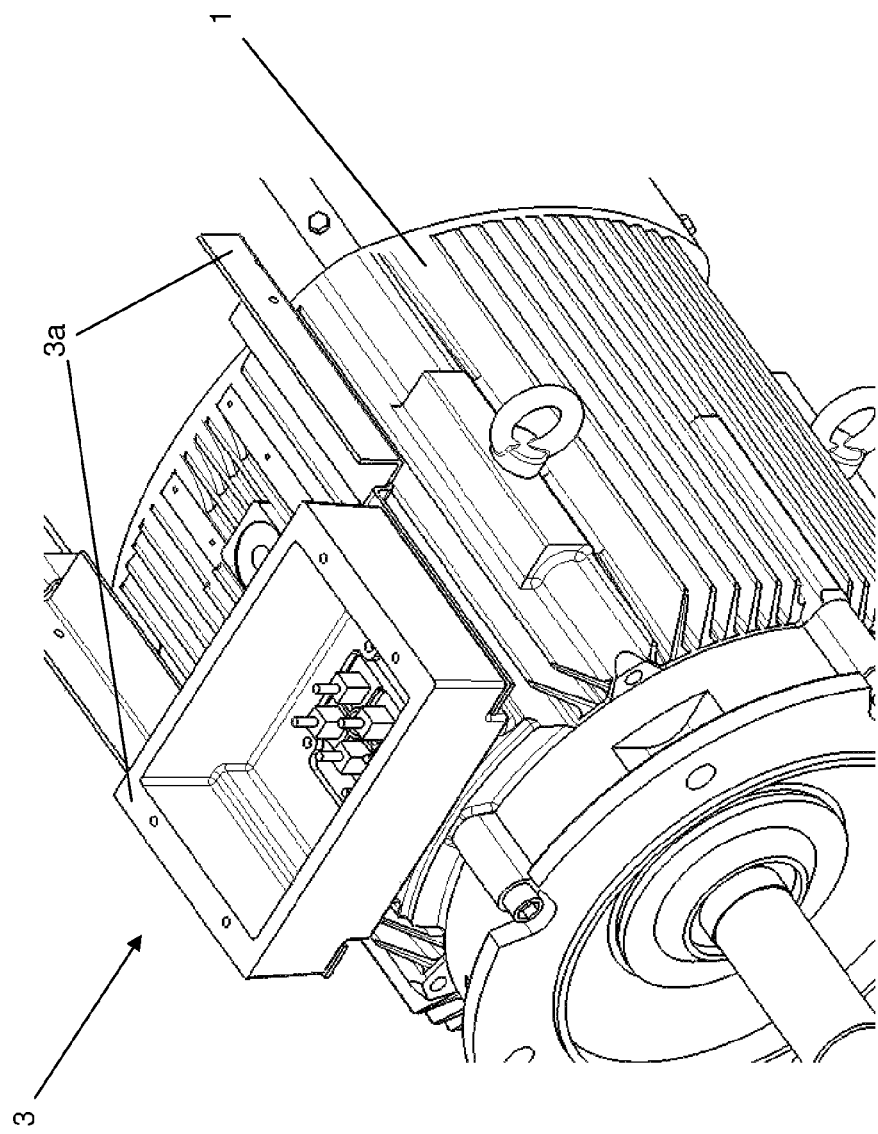
FIG. 3 illustrates the motor and the intermediate component of the frequency converter assembly shown in FIG. 1 with the intermediate component mounted on the motor and being in position to accept the lower part of the housing of the frequency converter.

Referring now to FIGS. 1, 2, and 3, a frequency converter assembly in accordance with an embodiment of the present invention will be described. The frequency converter assembly includes a frequency converter, an electric motor, and an intermediate component 3. The frequency converter is for controlling the motor. The frequency converter is to be mounted on the motor with intermediate component 3 therebetween such that the frequency converter and the motor form a combined structural unit.

The frequency converter includes a converter housing 2. Converter housing 2 includes a lower housing part 2a and a housing cover (not shown). Lower converter housing part 2a fulfills various functional roles. The function of the housing cover is to seal lower converter housing part 2a. Lower converter housing part 2a contains a printed circuit board 4. Printed circuit board 4 includes control and power electronic components 5 of the frequency converter. Electronic components 5 are mounted on printed circuit board 4. Lower converter housing part 2a may be composed of a material having a high thermal conductivity such as aluminum. Lower converter housing part 2a may include cooling fins on its lower external wall through which heat losses arising primarily in the power components of the frequency converter can be removed effectively. Screw cable connections 8 are on the outer side walls of lower converter housing part 2a through which at least one main power line and other control and/or sensor lines are introduced from outside into the interior of converter housing 2.

The motor includes a motor housing 1 and a terminal block 7. Terminal block 7 of the motor is part of motor housing 1. In particular, terminal block 7 of the motor is attached to a fitting 1a of motor housing 1.

Intermediate component 3 performs the function of a terminal box and thereby replaces the terminal box. Intermediate component 3 includes retaining elements. The retaining elements of intermediate component 3 are configured to be used to mechanically fasten lower converter housing part 2a to intermediate component 3. Lower converter housing part 2a includes an opening 6 on its underside.

Terminal block 7 of the motor is accessible through opening 6 on the underside of lower converter housing part 2a. Terminal block 7 is accessible through opening 6 in order to enable electrical connector lines to be fastened to and/or released from terminal block 7 after lower converter housing part 2a is fastened onto intermediate component 3 and before the housing cover is placed onto lower converter housing part 2a.

The mechanical fastening of lower converter housing part 2a to motor housing 1 is accomplished by intermediate component 3. As noted above, intermediate component 3 also performs the function of a terminal box.

In FIG. 2, the motor is shown prior to assembly of intermediate component 3 onto the motor. As such, terminal block 7 of the motor is also shown in FIG. 2 as terminal block 7 is exposed in the absence of intermediate component 3. Terminal block 7 is located on a fitting 1a of motor housing 1. The electrical connecting terminals of terminal block are connected inside motor housing 1 with the connector lines of the motor (i.e., with the motor windings).

As shown best in FIG. 3, intermediate component 3 is screwed directly to fitting 1a of motor housing 1. Intermediate component 3 forms a shaft that protectively surrounds terminal block 7 of the motor. Intermediate component 3 is used to fasten lower converter housing part 2a to retaining elements 3a provided on motor housing 1. Lower converter housing part 2a is fastened with screws to retaining elements 3a.

In the state shown in FIG. 1, lower converter housing part 2a with printed circuit board 4 that holds frequency converter electronic components 5 is mounted on intermediate component 3. In this state, terminal block 7 of the motor is readily accessible for maintenance of the connecting lines. As such, the lines leading outwardly from printed circuit board 4 can be fitted directly to the terminals of terminal block 7 according to its specific design by clamping or screwing on.

The external supply lines, which pass from the outside through cable fittings 8 present in the outer side walls of lower converter housing part 2a, can be fitted in the same operational step on terminals provided for this purpose on printed circuit board 4.

Following the successful internal wiring, the housing cover is placed on lower converter housing part 2a and screwed together with lower converter housing part 2a to ensure closure of converter housing 2.

While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A frequency converter assembly comprising:
    a frequency converter having a converter housing including a lower converter housing part and a circuit board within the lower converter housing part, the circuit board having electronic components for the frequency converter, an underside of the lower converter housing part having an opening, the circuit board being positioned within the lower converter housing part offset to a side of the opening on the underside of the lower converter housing part;
    a motor having a motor housing with a fitting, the motor further having a terminal block having terminal contacts, the terminal block attached directly to the fitting of the motor housing with electrical lines from the motor connected within the motor housing to the terminal block; and
    an intermediate terminal box component around the terminal block and attached, separate from the attachment between the terminal block and the fitting of the motor housing, to the fitting of the motor housing and attached to the lower converter housing part such that the terminal block is accessible through the opening on the underside of the lower converter housing part without the circuit board interfering with the accessibility of the terminal block due to the circuit board being positioned within the lower converter housing part offset to the side of the opening on the underside of the lower converter housing part to enable electrical lines from the circuit board to be connected to and released from the terminal contacts subsequent to the intermediate terminal box component being attached to the lower housing converter part and prior to a housing cover being placed onto the lower converter housing part.

2. The assembly of claim 1 wherein:
the intermediate terminal box component has a retaining element to fasten the converter housing to the intermediate terminal box component.

3. The assembly of claim 1 wherein:
the lower converter housing part includes aluminum.

4. The assembly of claim 1 wherein:
the lower converter housing part includes cooling fins.

* * * * *